United States Patent

[11] 3,581,622

| [72] | Inventors | Hans Maass<br>Bad Lauterberg/Harz;<br>Albert Bottcher, Scharzfeld/Harz, both of,<br>Germany |
|---|---|---|
| [21] | Appl. No. | 826,872 |
| [22] | Filed | May 22, 1969 |
| [45] | Patented | June 1, 1971 |
| [73] | Assignee | Franz Kuhlmann K.G, Pragisionsmechanik<br>und Maschinenbau<br>Wilhelmshaven, Germany |
| [32] | Priority | May 24, 1968 |
| [33] | | Germany |
| [31] | | P 17 52 423.1 |

[54] PATTERN CONTROLLED MILLING MACHINE WITH A PANTOGRAPH AND A LINE SCANNER
4 Claims, 4 Drawing Figs.

[52] U.S. Cl................................................. 90/13.1,
33/23R

[51] Int. Cl.................................................. B23c 1/16
[50] Field of Search......................................... 90/13.1;
33/23 A, 25 A, 25 C

[56] References Cited
UNITED STATES PATENTS

| 2,793,569 | 5/1957 | Tanner et al................. | 90/13.1 |
| 3,211,061 | 5/1965 | Cretsinger..................... | 90/13.1 |

*Primary Examiner*—Gil Weidenfeld
*Attorney*—Edwin E. Greigg

ABSTRACT: In a pattern controlled milling machine including a pantograph, the manual force exerted by an operator for guiding the tracer point of the pantograph is transmitted to the pantograph by a guide lever, one end of which carries a handle for manual engagement, the other end of which is swingably supported. The free end of the pantograph carries said tracer point and is swingably attached to the guide lever between its two ends.

PATTERN CONTROLLED MILLING MACHINE WITH A PANTOGRAPH AND A LINE SCANNER

The invention relates to a copy milling machine with a pantograph whose pivot axis is perpendicular to its plane of swing and includes a device for linewise scanning of a model and for milling the workpiece; the tracing point which is fastened or clamped to the pantograph is guided vertically on a slider that is substantially tangentially adjustable with respect to the swinging path of the pantograph.

In a known form of copy milling machines of this kind, there are two spindle-driven sliders, the primary one of which is tangentially adjustable relative to the swinging path of the pantograph and has positioned on it a secondary slider in the form of a cross support which is mounted perpendicular to the horizontal axis of movement of the primary or lower slider. This secondary or upper slider carries a vertical guideway such as a guide sleeve that is guided vertically in a handle carried by the free end of the pantograph and is mounted in such a manner that the pattern can be traced off by the tracer point and the cutter moved across the workpiece accordingly. Thus, the tracer point can then be moved in a horizontal plane only by means of the two spindle-driven sliders.

A copying machine which is capable only of such linewise scanning is inconvenient to operate because movements in each of the three directions in space requires the manipulation of a separate member. It also requires considerable exertion by the operator for short, limited movements by means of the handles. With such an apparatus there is not only the necessity of exerting excessive force upon the pantograph by hand, which soon tires the operator and gives him the impression that an opposing force is working against him, but also this naturally makes it difficult to keep the tracing point on the pattern.

The purpose of this invention is to provide a pattern milling machine with line-by-line scanning which can be operated in a simple manner and which offers favorable conditions for hand operation so as to require only very slight physical exertion for hand operation and is therefore very responsive to the touch of the operator.

In the pattern milling machine of this invention described hereinabove, this purpose is accomplished in a remarkably simple manner by providing for guiding the tracer point and for introducing manual force into the pantograph an angularly movable guide lever which is held on the slider and is pivotable about two axes switch are perpendicular to one another and to the direction of travel of the slider. The free end of the guide lever is provided with a handle. To the guide lever, between its free end and its pivot point, there is attached—by means of a ball joint or the like—the tracer point or the free end of the pantograph in such a manner that approximately the total length of the guide lever corresponds to the power of a single-arm lever and the length of that portion of the guide lever which extends between the pivot point and the ball joint, corresponds to the load arm of said single arm lever. The result of this arrangement is that the tracing point, while being guided by a single slider by means of a single member, namely the guide lever, can be moved in two spatial axes, for which only little force is necessary, and whereby the sense of touch of the operator is rendered more sensitive. An additional advantage is that this solution of the problem permits the use of a relatively simple and inexpensive mechanism.

The invention also provides that a single swinging arm can be used which can be fixed in its swinging movements about a horizontal axis of swing which is perpendicular to the direction of movement of the slider, that the swinging arm at its free end which is directed away from the slider carries a guide rail or the like which is parallel to the axis of swing and to which the guide lever is articulated, and that furthermore the bearing of the guide lever can be axially adjusted and fixed on the guide rail and/or the latter relative to the swinging arm, whereby the pivot point of the swinging lever can be conveniently and advantageously repositioned in accordance with the size and form of the model.

According to this invention, the guide lever is mounted for angular movement on the guide rail by means of a cross pivot whereby in the second case the guide rail can serve as the horizontal axis, which constitutes an especially simple form of pivot point for the guide lever.

Other objects and advantages will become apparent from the following description taken in conjunction with the accompanying drawings, in which.

Figure 1:
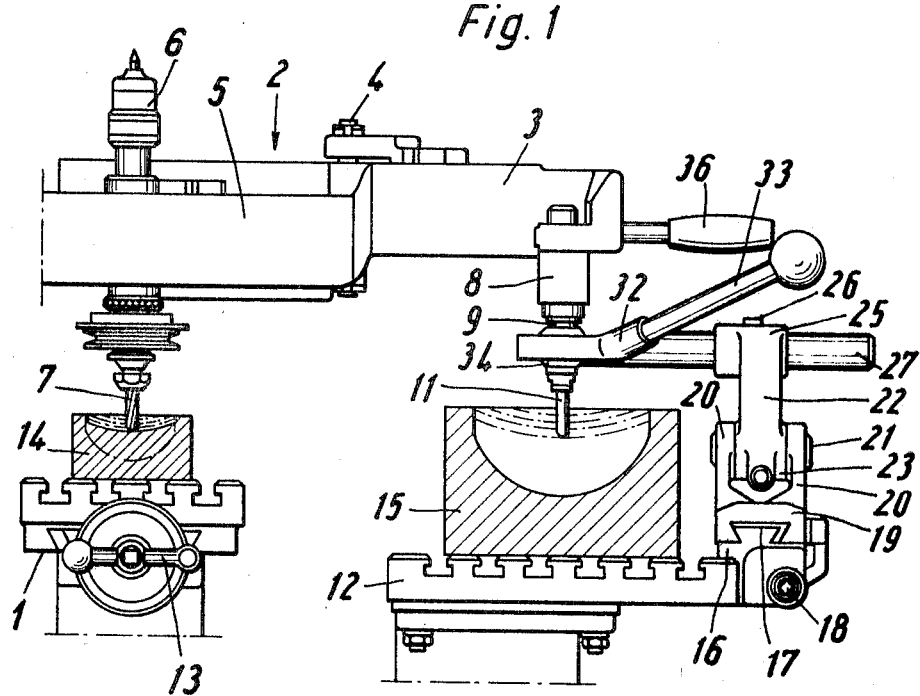
FIG. 1 is a horizontal partial sectional view of a pattern milling machine with a mechanism for linewise tracing of a pattern and milling of a workpiece.

Turning at this time to the drawings, there is shown in sufficient detail for those skilled in this art the pantograph 2 of a pattern controlled milling machine positioned above the pedestal table 1. The pantograph which can be swung toward the pedestal about or near its own swing point and also about a horizontal axis, carries at its outer short articulated arm 5, which is adjustable on the long arm 3 by means of an adjusting bolt 4, a milling spindle 6 in which a cutter 7 is clamped.

Figure 2:
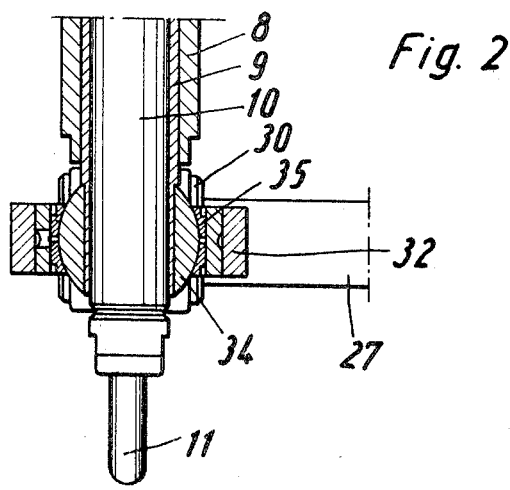
FIG. 2 shows in vertical cross secton the junction of the pantograph with the line tracing mechanism.
Figure 3:
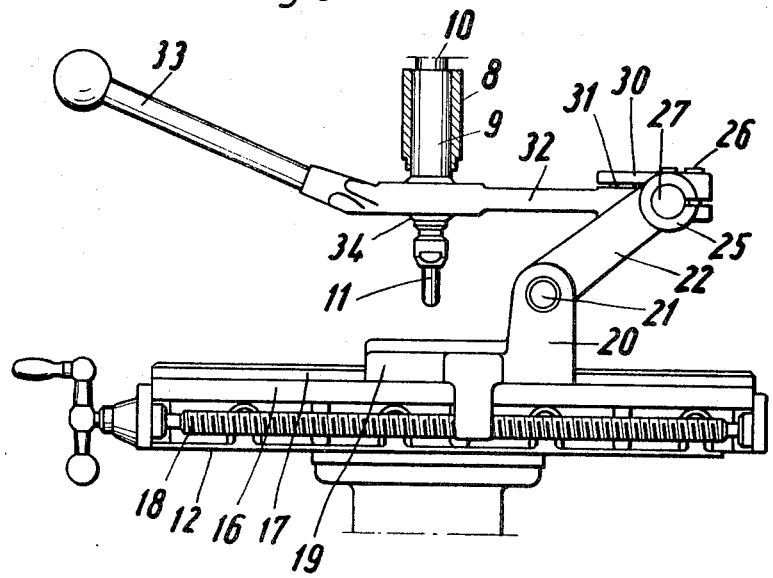
FIG. 3 is a side elevational view showing the line tracing mechanism of FIG. 1.
Figure 4:
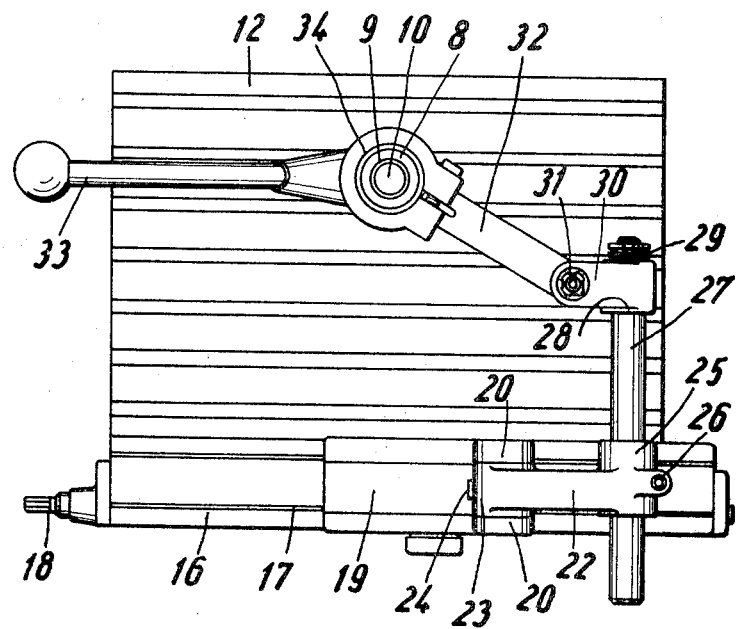
FIG. 4 is a plan view of the entire machine.

At the free end of the long outer arm 3, a sleeve 8 surrounds a guide bushing 9 in which is supported a shaft 10 for receiving a tracer point 11, these parts, shown in FIGS. 2 to 4, being disposed above the pattern table 12.

The pedestal table 1 and the pattern table 12 are equipped in a known manner with a spindle drive 13 for vertical or horizontal adjustments to be imparted in a known manner to the workpiece 14 or to the pattern 15. The pantograph is adjusted to a translation ratio of 1:2.

As shown in FIGS. 1, 3, and 4, the pattern table 12 has detachably secured to it a bed 16 with a dovetail guide 17 for a horizontal sled 19 which is adjustable by means of a spindle 18 to position it tangentially relative to the swinging curve of the pantograph.

The slider 19 carries a bearing 20 with a bearing bolt 21 fastened therein which extends through an eye 23 at the lower end of a vertically swinging arm 22 which can be moved into adjusted position by means of a screw 24.

The swinging arm 22 carries at its upper free end a clamp bearing 25 and a screw 26 for clamping a guide bar 27 in axially adjusted position.

The guide bar 27 carries for swinging movement thereon a cross pivot 30 pivotally mounted on the end of the guide bar 27 between a shoulder 28 and spring plates 29 for pivotally supporting a guide lever 32 for swinging movement about a vertical axis 31 relative to the guide bar 27 and the slider 19. The guide lever 32 carries at its free end and as an elongation thereof a handle 33. It is thus seen that the guide lever 32 is angularly movable about two mutually perpendicular axes which are normal to the direction of travel of slider 19.

To the guide lever 32 there is swingably secured, the free end of the pantograph, that is, the free end of the outer long arm 3 of the pantograph by means of a ball joint formed of ball 34 and spherical shells 35 (FIG. 2). This connection between the free end of long arm 3, and the guide lever 32 is effected by a shaft 10 which extends from the arm 3 through a guide bushing 9 and which carries at its end, remote from arm 3, the tracer point 11. By virtue of the aforedescribed connection between the free end of long arm 3 and the guide lever 32, the total length of the guide lever 32 including the handle 33, corresponds to the power arm of a single-arm lever, and the length of that portion of the guide lever 32 which extends between the pivot point at the cross pivot 30 and the ball joint 34,35, corresponds to the load arm of said single-arm lever. By "power arm" there is meant that portion of the guide lever 32 through which the operator may exert manual force on the pantograph. As set forth, this portion is the entire length of the guide lever 32 plus the effective length of the handle 33. By "load arm," in turn, there is meant that portion of the guide lever 32 through which a force opposing the manual force is exerted. It is seen, particularly upon observation of FIGS. 3 and 4, that the tracer point 11 and the free end of arm 3 act upon the guide lever 32 at the same location and divide the guide lever 32 into two portions: one portion is the load arm through which the force introduced by the pantograph arm 3 acts as a torque on the cross pivot 30; the other portion is the power arm through which the manual force introduced at handle 33 acts as an opposite torque on the cross pivot 30. Because of the aforedescribed leverage structure the arm associated with the manual force is substantially greater than the arm associated with the opposing load.

In pantographs known heretofore, a substantial force had to be exerted by the operator, since the relatively large resistance which is generated during the penetration of the cutter into the workpiece had to be overcome without any transformation of the manual force by a leverage structure. Thus, according to the invention, such a leverage is provided by the guide lever 32 permitting a reduction of the manual input force exerted by the operator.

Furthermore, by pivotally securing the guide lever 32 to the cross pivot 30 and attaching the latter to the slider 19, there is provided a line scanning device which is simple to operate and which, again, requires very small manual force.

The aforedescribed lever structure has the further advantage that a possible motion of the guide lever 32 about two mutually perpendicular axes permits a sensitive three-dimensional tracing.

The possibility of the three-dimensional movement of the pantograph further permits a linewise finishing milling. With the heretofore known line-by-line milling devices for pantograph-type copying milling machines, only a rough milling may be performed. If in such apparatus the pantograph is separated from the line-by-line milling device, the necessary stepdown of the force transmission will be missing.

A further advantage of the inventive structure resides in the fact that the entire lever system may be swung about the axis of shaft 27 rearwardly out of the working zone if no longer needed. The result is that the apparatus may be readied for operation very rapidly, because the device does not have to be taken off in its entirety.

The feature of arranging the cross pivot 30 by means of a shaft 27 on the swinging arm 22 has the advantage that after loosening the screw 24, the arm 22 may be turned about the bearing bolt 21 in order to adjust the traveling zone of the line-by-line milling machine to correspond to the height of the pattern.

At the free end of the outer long arm 3 of the pantograph a handle 36 is provided which serves as a guide member when the linewise scanning mechanism is not used and is omitted.

By means of the guide lever 32 the tracer point 11 can be delicately moved step-by-step on the contours of the pattern 15 and by stepwise shifting of the slider 19 can be guided linewise along the pattern, and because of the leverage, the force can be transmitted through the pantograph 2 to the cutter 7 for cutting into the workpiece 14 with very little physical exertion. The visual watching of the tracer point 11 on the pattern 15 and of the cutter 7 on the workpiece 14 is not in any manner thereby interfered with.

The linewise scanning of the pattern 15 and the cutting into the workpiece 14 is shown by dotted lines in FIG. 1.

The turning point of the guide lever 32 can be chosen as required by the form and size of the workpiece and of the model by adjustment of the swinging arm 22 relative to the slider 19 and of the guide bar 27 relative to the swinging arm 22.

We claim:

1. In a pattern controlled machine tool, such as a milling machine, of the type that includes (A) a pantograph carrying, at its free end, a tracer point in contact with a pattern and (B) a mechanism for a line-by-line scanning of said pattern and for cutting a workpiece accordingly, said mechanism includes a slider being linearly movable adjacent pattern support means, the improvement comprising,
    A. a guide lever,
    B. a handle attached to a first end of said guide lever; said handle being manually engageable to impart a manual force to said guide lever,
    C. pivot means securing a second end of said guide lever to said slider and permitting a swinging motion of said guide lever about two axes mutually perpendicular with respect to one another and normal to the direction of motion of said slide and
    D. ball joint means for angularly movably attaching said free end of said pantograph and said tracer point to said guide lever at a location between said first and second ends thereof; substantially the entire length of said guide lever constituting a power arm and the guide lever portion between said pivot means defined in (C) and said ball joint means defined in (D) constituting a load arm.

2. An improvement as defined in claim 1, including
    A. a swinging arm,
    B. bearing means pivotally securing one end of said swinging arm to said slider and permitting said swinging arm to angularly move about a horizontal axis which is normal to the direction of travel of said slider,
    C. a guide bar secured to the other end of said swinging arm, said guide bar extends parallel to said horizontal axis and
    D. means for swingably securing said second end of said guide lever to said guide bar, said last-named means forms part of said pivot means.

3. An improvement as defined in claim 2, including means for adjusting said guide lever along said swinging arm.

4. An improvement as defined in claim 2, wherein said pivot means is formed as a cross pivot secured to said guide bar and to said second end of said guide lever, the axis of said guide bar is one of said mutually perpendicular axes about which said guide lever is swingable.